Patented May 15, 1923.

1,454,960

UNITED STATES PATENT OFFICE.

HENRY DREYFUS, OF LONDON, ENGLAND.

CELLULOSE-ARALKYL-ETHER COMPOSITION.

No Drawing. Application filed November 16, 1920. Serial No. 424,512.

*To all whom it may concern:*

Be it known that I, HENRY DREYFUS, a citizen of the Swiss Republic, residing at London, England, have invented certain new and useful Improvements in Cellulose-Aralkyl-Ether Composition, of which the following is a specification.

This invention relates to the manufacture of solutions, films, artificial filaments, celluloid-like masses, electric insulating materials, varnishes, coating materials or other compositions, preparations or articles made with aralkylated derivatives of cellulose hereinafter referred to.

In addition to the volatile solvents or diluents which are generally used in making solutions or other products such as referred to, (all of which are hereinafter included in the term "compositions of matter") with cellulose derivatives, or in some cases even without such volatile liquids, higher boiling solvents called plastic isiner agents are employed for the cellulose derivative or derivatives forming the basis of the solutions, compositions or products.

In the specification of a previous U. S. Patent No. 1,353,384 dated 21st September, 1920, I have described the employment as high boiling plasticising solvents for cellulose acetate, or high boiling mixtures of isomeric xylene low carbon alkyl sulphonamides, which mixtures are liquids at ordinary temperature, and are such as can be obtained by treating an ordinary commercial xylene, distilling for example at about 135° to 146° C., by the ordinary methods of conversion into the alkyl sulphonamides, for example by treating the crude xylene with chlorosulphonic acid to form the corresponding sulphonamides, and then with ammonia to convert these into the sulphonamides, and then methylating same to the mono or dimethyl stage or ethylating to the monoethyl stage; or by treating the said mixed sulphochlorides with amines such as methylamine, ethylamine, etc.

In the specification of another U. S. Patent No. 1,353,385 dated 21st September, 1920, I have described the employment as high boiling plastifying solvents for cellulose acetate, of high boiling mixtures comprising *o* and *p* toluene low carbon alkyl sulphonamides, which mixtures are liquid at ordinary temperature, and are such as can be obtained on treating commercial toluene by ordinary methods of conversion into the alkyl sulphonamides, for example by treating the toluene with chlorosulphonic acid to form the corresponding sulphochlorides, treating the resulting raw mixture with ammonia to convert the sulphochlorides into sulphonamides, and then methylating or ethylating to the monomethyl or monoethyl stage, or by treating the said raw mixture with amines such as methylamine, ethylamine, etc.

In my British Patent No. 154334 and in the specification of another application for U. S. patent Serial No. 401,380 I have described the employment of certain other aromatic alkylated sulphonamide derivatives or preparations as high boiling solvents for cellulose acetate, namely:—

Benzene monomethyl sulphonamide. This substance boils at about 180° C. under 1–2 mm. pressure, is liquid at ordinary temperature and forms a clear, soft jelly at —15° C.

Benzene methyl ethyl sulphonamide. Boils at about 170°–175° C. under 1–2 mm. pressure, is liquid at ordinary temperature and forms a soft turbid jelly at —25° C.

Mixtures of o- and p-toluene dimethyl sulphonamides. Such mixtures boil at about 133°–137° C. under 1 mm. pressure, are liquid at ordinary temperature, form slightly turbid jelly at —15° C. and a firm turbid jelly at —20° C.

Mixtures of o- and p-toluene methyl ethyl sulphonamides. Such mixtures boil at about 188°–189° C. under 1 mm., are liquid at ordinary temperature, form soft, clear jellies at —15° C. and form clear jellies at —20° C.

Mixtures of o- and p-toluene diethyl sulphonamides. Such mixtures boil at about 136°–142° C. under 1 mm., are liquid at ordinary temperature, form soft, clear jelly at —10° C. and a firm, clear mass at —20° C.

O-toluene dimethyl sulphonamide. This substance boils at about 148°–152° C. under 2 mm. is liquid at ordinary temperature, forms a soft, clear jelly at —10° C. and a firm, clear jelly at —20° C.

O-toluene diethyl sulphonamide. This substance boils at about 152°–155° C. under 2 mm., is liquid at ordinary temperature, forms a soft, clear jelly at —5° C. and a firm, clear jelly at —20° C.

Mixtures of isomeric xylene diethyl sulphonamides. Such mixtures boil at about 148°–154° C. under 1 mm. pressure, are liquid at ordinary temperature, and form a soft, clear jelly at —5° C. and a firm, clear jelly at —20° C.

Mixtures of isomeric xylene methyl ethyl sulphonamides. Such mixtures boil at about 155°–156° C. under 1 mm., are liquid at ordinary temperature, form clear, soft jellies at —14° C. and slightly harder jellies at —20° C.

In preparing the said benzene methyl ethyl sulphonamide derivative, ordinary commercial benzene was used, for example an impure benzene distilling between 79°–88° C. (90% going over at about 78°–80° C.).

For preparing the said mixtures of o and p-toluene alkyl sulphonamides ordinary commercial toluene was used, distilling between 95° and 132° C., and substantially pure toluene boiling at 110°–111° C. for the o-toluene dimethyl and o-toluene diethyl sulphonamide product, whilst for the mixtures of isomeric xylene dialkyl sulphonamides an ordinary commercial xylene was used distilling between 135° and 146° C. (about 78% between 135° and 139° C.).

The preparation however is not confined to working with these particular grades of the hydrocarbons. For example pure benzene may be used for the benzene methyl sulphonamide, or purer to pure toluene may be used for producing the mixtures of o- and p-toluene alkyl sulphonamides.

The procedure followed for preparing the alkyl sulphonamide products referred to may be according to the ordinary methods of preparing such alkylated compounds via the sulphochlorides, these either being treated with ammonia and then alkylated with the appropriate alkylating agent such as dimethyl sulfate or ethyl sulfuric acid salt or chlorethyl, etc., or being treated direct with amines, such as methylamine, ethylamine, etc.

In cases where the commercial or impure hydrocarbon is indicated above as having been used, the treatment was carried out thereon without separation or purification of the intermediate or final products. In the case of the o-toluene dimethyl and diethyl sulphonamides the mixture of o- and p-toluene sulfochlorides resulting from the treatment with chlorosulfonic acid was cooled in the ordinary way (at about —10° C.) and the crystallized p-sulfochloride was separated from the o-sulfo-chloride by filtration.

The preparation of the aromatic alkyl sulfonamides hereinbefore referred to, is not however, limited to the particular procedure indicated and any other methods giving substantially similar products may be employed.

All of the hereinbefore mentioned aromatic sulfonamide derivatives or preparations have high boiling points, are liquid at ordinary temperature, becoming more viscous and gelatinous when cooled to low temperatures (below about 0° C.), and they are insoluble or very little soluble in water. They are all hereinafter included in the term high boiling aromatic low carbon alkyl sulfonamide preparations.

In the specification of my British Patent No. 164375 and of my application for U. S. patent Serial No. 401,383 filed August 5th, 1920, I have described the production of new or alkylated derivatives of cellulose representing cellulose having introduced into its molecule one or more benzyl groups or homologues of them in the nucleus or the side chain, such for example as methylbenzyl groups, phenylethyl groups corresponding to side chain chlorethyl-benzenes $$(C_6H_5.CH_2.CH_2.Cl \text{ or } C_6H_5CHCl.CH_3),$$

or substitution groups of any of the benzyl or homologous groups, in the nucleus, such as methoxy benzyl groups; or groups derived from xylenes, or their substitution products or homologues, for example using as agents xylene derivatives in which one hydrogen atom of each or any methyl group or groups is replaced by chlorine atoms; the said specification likewise includes "mixed" cellulose derivatives representing cellulose having introduced into its molecule different members of groups such as aforesaid.

The said aralkylated ethers of cellulose can be obtained by treating cellulose or other like cellulosic body not soluble in alkali, with the corresponding aralkyl halides or other aralkylating agents, in presence of alkali, whilst restricting the water present, whether contained in or added to the cellulosic body before the etherification or added during the etherification (disregarding water formed in the reaction itself) to an amount not greater than from about the natural humidity content of the cellulosic body up to about four times the weight of the cellulosic body, and preferably not greater in amount than about one-half to one and a half times this weight, the total alkali used in the etherification process being at least equal in weight to, and preferably exceeding, in a ratio of from 3 : 1 to 19 : 1 or more, the weight of water present or added during the etherification, (disregarding water which may be formed in the reaction itself), the total quantity of alkali required being introduced either all at once, or preferably interruptedly at different stages and the etherifying agent or agents being introduced either all at once, or preferably at different stages or continuously.

In the specification of my British Patent No. 164377 and of my application for U. S. patent Serial No. 401,385, filed August 5th, 1920, I have described the production of new "mixed" cellulose derivatives representing cellulose having introduced into its molecule one or more groups of the benzylic class and one or more aliphatic alkyl groups such as methyl groups, ethyl groups or their homologues, that is to say aralkylated aliphatic cellulose ethers, which are likewise hereinafter included in the term aralkyl cellulose ethers. The said aralkylated aliphatic cellulose ethers can be obtained similarly to the aforesaid aralkyl ethers of cellulose, using the corresponding aliphatic and aralkyl etherifying agents for the etherification, these different etherifying agents being added separately, or together in the etherification.

The present invention is characterized by the application or employment of any of the aforesaid high boiling aromatic low-carbon alkyl sulphonamide derivatives or preparations. As high boiling solvents or plastic inducing agents for the aralkyl cellulose ethers (including also in this term the aralkylated aliphatic cellulose ethers as referred to) in the manufacture of solutions, films, artificial filaments, celluloid-like masses, electric insulating materials, varnishes, coating materials or other compositions, preparations or articles.

Any of the aforesaid alkylated sulphonamide derivatives or preparations may be employed or any mixtures of two or more of them, in carrying out the invention.

It will be understood that for making the solutions, films, filaments, celluloid-like masses or other products referred to, any one or more of the said cellulose ethers or mixtures thereof may be employed in conjunction with the said alkylated sulphonamide derivatives. It is also to be understood that any known esters, ethers or other dreivatives of cellulose may also be used together with the said cellulose ethers.

The said alkylated sulphonamide derivatives or preparations may be employed in any suitable proportions, variable according to the degree of hardness, softness, or pliability desired in the ultimate product, or other circumstances.

They may be employed with or without solvents or liquids of lower or low boiling point, according to requirements.

Any known high boiling solvents or plastic inducing substances, such as triacetin and so forth, or even other aromatic sulphonamide derivatives previously proposed as plasticisers, may be added or used with the said alkylated sulphonamide derivatives or preparations. Likewise any other suitable or desired substances having particular effects may be used or added with them, such as triphenyl phosphate, tricresyl phosphate, castor oil, acid neutralizing aliphatic derivatives of urea which are liquid or have a low melting point, such as mono-, di- or tri-methyl or mono-, di- or tri-ethyl urea, colouring matters, filling materials and any other materials suitable for the product to be made.

The following are some examples of the manner in which the invention may be carried out, it being understood that they are given only by way of illustration and may be varied within wide limits without departing from the invention. The parts are by weight.

A. *For making celluloid-like materials.*

To each 100 parts of benzylic cellulose derivative made according to Example 1 or 2 of the said British specification 164375 (U. S. specification S. 401,383), for example, one may take about 25 parts of benzene-monomethyl sulphonamide, toluene-o-monoethyl sulphonamide, mixtures of isomeric xylene monomethyl or monoethylsulphonamides, or others of the alkylated sulphonamide derivatives before referred to or mixtures thereof, as high boiling solvent or plasticiser, and about 12 parts of tricresyl-phosphate or triphenylphosphate, these substances being mixed together with a low boiling solvent of the benzylic cellulose derivative, for example benzol, the mass being worked in the ordinary way in the celluloid apparatus, first in the mixers, then on the rollers and afterwards in the presses, and so on, as generally practised in the celluloid industry. The above proportions will give relatively hard, incombustible or low-flammable celluloid-like materials.

By reducing the quantity of the alkylated sulphonamide derivatives, together with the triphenyl or tricresyl phosphate, a still harder celluloid-like material may be obtained.

On the other hand, by increasing the quantity of the alkylated sulphonamide derivatives, proportionately softer celluloid-like materials are obtained. For example, if one takes to 100 parts of the benzylic cellulose derivative 100 parts of the sulphonamide derivatives, celluloid-like materials may be obtained which are pliable like a fabric and if less than 100 per cent of the sulphonamide derivatives are taken per 100 parts of the benzylic cellulose derivative a proportionately stiffer material is obtained according to the reduction of the quantity of the sulphonamide derivatives, whilst if the quantity of these is increased above 100 per cent a still more pliable material is obtained.

B. *For films and varnishes.*

The benzylic cellulose derivative made according to Example 1 or 2 of the said British 164375 specification (U. S. specification Serial No. 401,383), for example, may be taken, say as an 8 to 10 per cent solution in a low boiling solvent thereof, such as benzol, and about 10% of one or more of the said sulphonamide derivatives (calculated on the weight of the benzyl cellulose) may be mixed with the solution as a high boiling solvent or plasticiser, with or without the addition of triphenyl phosphate or tricresyl phosphate in a proportion of about 10% relatively to the quantity of the benzylic cellulose derivative.

As an instance of the application of the invention with a "mixed" or aralkylated aliphatic cellulose derivative, a benzyl-ethyl cellulose derivative made according to the said British specification 164377 (U. S. specification Serial No. 401,385), may be employed in place of the benzylic cellulose derivative in the above examples, a suitable solvent of low boiling point being employed, such as alcohol-benzol.

What I claim and desire to secure by Letters Patent is:—

A composition of matter containing an aralkylated derivative of cellulose and a high boiling aromatic low-carbon alkyl sulfonamide preparation which is liquid at ordinary temperature and becomes more viscous and gelatinous at low temperatures.

In testimony whereof I have hereunto subscribed my name.

HENRY DREYFUS.